US011635771B2

(12) United States Patent
Cheung et al.

(10) Patent No.: US 11,635,771 B2
(45) Date of Patent: Apr. 25, 2023

(54) CENTRALLY DISPATCHED POWER SUPPLY USING AUTONOMOUS ELECTRIC VEHICLE FLEET

(71) Applicant: GM Cruise Holdings LLC, San Francisco, CA (US)

(72) Inventors: Tracy Cheung, San Francisco, CA (US); Adam Mandel-Senft, Phoenix, AZ (US); Daniel Henry Curzon, Phoenix, AZ (US); Michael Frank Schmidt, Scottsdale, AZ (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 323 days.

(21) Appl. No.: 16/892,810

(22) Filed: Jun. 4, 2020

(65) Prior Publication Data
US 2021/0382501 A1    Dec. 9, 2021

(51) Int. Cl.
| | |
|---|---|
| *H02J 7/00* | (2006.01) |
| *G05D 1/02* | (2020.01) |
| *G06Q 10/0631* | (2023.01) |
| *G06Q 50/06* | (2012.01) |
| *G06Q 50/30* | (2012.01) |
| *B60L 53/36* | (2019.01) |
| *B60L 53/53* | (2019.01) |
| *B60L 58/12* | (2019.01) |
| *B60L 53/62* | (2019.01) |
| *G06Q 30/016* | (2023.01) |
| *G05D 1/00* | (2006.01) |

(52) U.S. Cl.
CPC ........... *G05D 1/0297* (2013.01); *B60L 53/36* (2019.02); *B60L 53/53* (2019.02); *B60L 53/62* (2019.02); *B60L 58/12* (2019.02); *G06Q 10/06312* (2013.01); *G06Q 10/06315* (2013.01); *G06Q 10/06316* (2013.01); *G06Q 30/016* (2013.01); *G06Q 50/06* (2013.01); *G06Q 50/30* (2013.01); *H02J 7/0048* (2020.01); *G05D 1/0088* (2013.01)

(58) Field of Classification Search
None
See application file for complete search history.

(56) References Cited

U.S. PATENT DOCUMENTS

| | | | | |
|---|---|---|---|---|
| 8,875,003 | B1 * | 10/2014 | Wolter | H03M 13/27 714/784 |
| 2020/0016994 | A1 | 1/2020 | Kydd | |
| 2020/0262305 | A1 * | 8/2020 | Chakraborty | B60L 53/62 |

* cited by examiner

*Primary Examiner* — Arun C Williams
(74) *Attorney, Agent, or Firm* — Akona IP

(57) ABSTRACT

A fleet management system dispatches autonomous electric vehicles (AEVs) as on-demand power sources. The fleet management system receives a request for a power source including a location and data describing the amount of power requested. The fleet management system selects an AEV of the fleet to service the request based on the relative locations of the AEVs to the requested location, and based on the amount of power requested. The fleet management system instructs the selected AEV to drive to the location and supply power. The fleet management system instructs the selected AEV to disconnect and return to the charging station, and may instruct another AEV to continue fulfilling the request if additional power is needed.

20 Claims, 5 Drawing Sheets

000
CENTRALLY DISPATCHED POWER SUPPLY USING AUTONOMOUS ELECTRIC VEHICLE FLEET

TECHNICAL FIELD OF THE DISCLOSURE

The present disclosure relates generally to battery-powered electric vehicles and, more specifically, to systems and methods for using a fleet of battery-powered autonomous electric vehicles as on-demand, mobile power supplies.

BACKGROUND

Power outages can cause major disruption in the lives of those affected. An aging electrical grid and increased occurrence of wildfires and extreme weather events may increase the frequency and spread of power outages in the future. Currently, few reliable options exist to maintain power during an outage, and the available options involve large upfront investments and infrastructure. One option is diesel generators, which are costly, loud, and polluting. Further, the energy output of the diesel generator is limited by the amount of fuel available; stocking up on fuel can be difficult and inconvenient, particularly for a long-term outage. Another option is a battery storage system, which requires a significant upfront investment and has a fixed, limited capacity.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Overview

Figure 1:
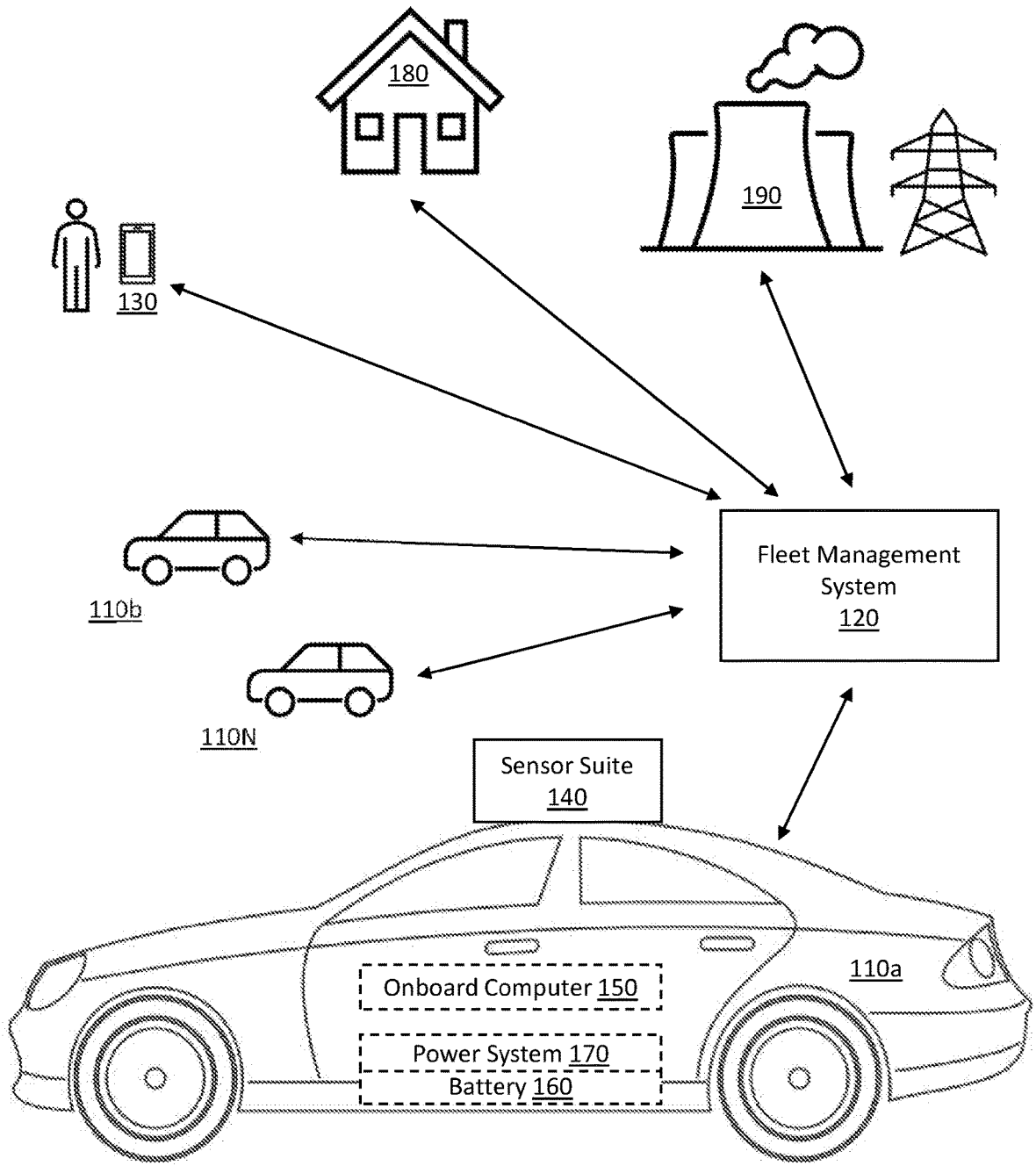
FIG. 1 is a block diagram illustrating a system for providing centrally-dispatched power supplies using a fleet of autonomous electric vehicles (AEVs), according to some embodiments of the present disclosure.

The systems, methods and devices of this disclosure each have several innovative aspects, no single one of which is solely responsible for all of the desirable attributes disclosed herein. Details of one or more implementations of the subject matter described in this specification are set forth in the description below and the accompanying drawings.

As described above, current backup power systems have various drawbacks, including high upfront costs and limited capacity. Many individuals do not have the financial resources to purchase or the space to store seldom-used backup power systems. Even in areas with high risks of power outages, such as regions prone to wildfires, many individuals do not have backup power systems, and instead must go without power for hours or days at a time. Furthermore, existing backup power systems are typically large, difficult to move, and complicated to install. This makes it difficult for people who experience a sudden power outage and do not have a backup system, or whose backup systems run out of power, to quickly get a new source of power.

As described here, electric vehicles can be used as a backup power source. In particular, a fleet of battery-powered autonomous electric vehicles (AEVs) can be dispatched on-demand to provide battery power to users. A fleet management system receives requests for power from users to provide power at specific locations, such as users' homes or businesses. For a given request, the fleet management system selects one or more AEVs of the fleet to provide power to the location based on various factors, such as the power demand (e.g., whether the request is to power a few devices, a house, or a multi-unit housing complex), any information describing the predicted duration of the power request (e.g., an estimated duration provided by a utility company), and the location of available AEVs relative to the location of the power request, and current battery levels of the available AEVs. A selected AEV drives to the location of the power request, and a user connects the AEV to a building or to individual devices to be powered by the AEV. For example, the user may connect the AEV to an electrical connector on his or her house to enable household devices and appliances to receive power from the AEV rather than from the grid. The fleet management system monitors the battery level of the AEV during service, and can swap out the first AEV for a second AEV when the battery level of the first AEV is running low. This way, the AEV fleet can provide continuous power during the power outage.

The fleet of AEVs provides on-demand power to users without the advanced planning or infrastructure investments required by existing backup power systems. In some examples, the fleet management system can receive power service status information from a utility and/or from in-home monitoring systems, and the fleet management system automatically dispatches AEVs in the event of an unexpected power outage, or in advance of a planned outage. The AEVs may provide power in other situations as well. For example, an AEV can provide a clean, quiet source of energy at a geographic location not serviced by the electric grid, such as a park or campsite. As another example, rather than servicing individual users, AEVs can connect directly to a power grid at the request of a utility company, e.g., to provide supplemental power during a peak demand period, or to service an area that is temporarily cut off from the power grid.

Embodiments of the present disclosure provide a method for dispatching a power source. The method includes receiving a request for a power source, the request including a location and timing data; determining an estimated amount of energy for servicing the request based at least in part on the timing data and data describing energy usage at the location; selecting an AEV from a fleet of AEVs to fulfill the request, the AEV selected based on a current location of the AEV, the location, a battery level of a battery of the AEV, and the estimated amount of energy for servicing the request; and instructing the AEV to drive to the location, where the AEV is configured to distribute electric power from the battery upon reaching the location.

Further embodiments of the present disclosure provide a fleet management system for dispatching a power source. The fleet management system includes a user interface server, a power source manager, and a vehicle manager. The user interface server is configured to receive a request for a power source at a location. The power source manager is configured to determine an estimated amount of energy for servicing the request based at least in part on a duration associated with the request and data describing energy usage at the location, and select an AEV from a fleet of AEVs to fulfill the request, the AEV selected based on a current location of the AEV, the location, a battery level of a battery of the AEV, and the estimated amount of energy for servicing the request. The vehicle manager is configured to instruct the AEV to drive to the location, and the AEV is configured to distribute electric power from the battery upon reaching the location.

Further embodiments of the present disclosure provide an AEV including a battery and a power system. The power system is configured to distribute energy from the battery to a plurality of components of the AEV during a driving mode, distribute energy from the battery to at least one external system during a power source mode, monitor a charge in the battery and a rate of energy distribution during the power source mode, and, in response to the charge level in the battery reaching a threshold level during the power source mode, discontinue distributing power to the at least one external system and entering the driving mode.

As will be appreciated by one skilled in the art, aspects of the present disclosure, in particular aspects of providing centrally dispatched power using a fleet of AEVs, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g. to the existing perception system devices and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims and/or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Other features and advantages of the disclosure will be apparent from the following description and the claims.

Example System for Dispatch-Based Charging

FIG. 1 is a block diagram illustrating a system 100 for providing centrally-dispatched power supplies using a fleet of autonomous electric vehicles (AEVs), according to some embodiments of the present disclosure. The system 100 includes a fleet of AEVs 110, including AEV 110a, AEV 110b, and AEV 110N, a fleet management system 120, a user device 130, a home 180, and a utility company 190. The fleet of AEVs 110 includes a number N of AEVs, e.g., AEV 110a through AEV 110N. AEV 110a includes a sensor suite 140, an onboard computer 150, a battery 160, and a power system 170. AEVs 110b through 110N also include the sensor suite 140, onboard computer 150, battery 160, and power system 170. A single AEV in the fleet is referred to herein as AEV 110, and the fleet of AEVs is referred to collectively as AEVs 110 or the fleet 110. The fleet management system 120 receives requests for power, e.g., a request from the user device 130 to provide power at the home 180. Based on data about the power request and the locations and charge levels of the AEVs in the fleet 110, the fleet management system 120 selects an AEV 110 to service the request, i.e., to drive to the location of the power request and provide power from the battery 160.

In some embodiments, each AEV 110 is a fully autonomous electric automobile. In other embodiments, each AEV 110 may additionally or alternatively be another semi-autonomous or fully autonomous vehicle, e.g., a boat, an unmanned aerial vehicle, a self-driving car, etc. Additionally, or alternatively, the AEV 110 may be a vehicle that switches between a semi-autonomous state and a fully autonomous state and thus, the AEV 110 may have attributes of both a semi-autonomous vehicle and a fully autonomous vehicle depending on the state of the vehicle.

Each AEV 110 may include a throttle interface that controls an engine throttle, motor speed (e.g., rotational speed of electric motor), or any other movement-enabling mechanism; a brake interface that controls brakes of the AEV (or any other movement-retarding mechanism); and a steering interface that controls steering of the AEV (e.g., by changing the angle of wheels of the AEV). The AEV 110 may additionally or alternatively include interfaces for control of any other vehicle functions, e.g., windshield wipers, headlights, turn indicators, air conditioning, etc.

The AEV 110 includes a sensor suite 140, which includes a computer vision ("CV") system, localization sensors, and driving sensors. For example, the sensor suite 140 may include photodetectors, cameras, radar, sonar, lidar, GPS, wheel speed sensors, inertial measurement units (IMUS), accelerometers, microphones, strain gauges, pressure monitors, barometers, thermometers, altimeters, ambient light sensors, etc. The sensors may be located in various positions in and around the AEV 110.

The onboard computer 150 is connected to the sensor suite 140 and functions to control the AEV 110 and to process sensed data from the sensor suite 140 and/or other sensors in order to determine the state of the AEV 110. Based upon the vehicle state and programmed instructions, the onboard computer 150 modifies or controls behavior of the AEV 110. The onboard computer 150 is preferably a general-purpose computer adapted for I/O communication with vehicle control systems and sensor suite 140, but may additionally or alternatively be any suitable computing device. The onboard computer 150 is preferably connected to the Internet via a wireless connection (e.g., via a cellular data connection). Additionally or alternatively, the onboard computer may be coupled to any number of wireless or wired communication systems.

The battery 160 is a rechargeable battery that powers the AEV 110 and can supply power to external systems. The battery 160 may be a lithium-ion battery, a lithium polymer battery, a lead-acid battery, a nickel-metal hydride battery, a sodium nickel chloride ("zebra") battery, a lithium-titanate battery, or another type of rechargeable battery. In some embodiments, the AEV 110 is a hybrid electric vehicle that also includes an internal combustion engine for powering the AEV 110, e.g., when the battery 160 has low charge. In some embodiments, the AEV 110 includes multiple batteries, e.g., a first battery used to power vehicle propulsion, and a second battery used to power autonomous driving hardware (e.g., the sensor suite 140 and the onboard computer 150).

The power system 170 controls the power and operation of the battery 160, as well as the distribution of power within the AEV 110. The power system 170 switches between various power modes, including (1) a driving mode in which the power system 170 distributes power from the battery 160 to various subsystems of the AEV 110 for driving, (2) a power source mode in which the power system 170 distributes power from the battery 160 to at least one external system, such as the home 180, and (3) a charging mode in which the battery 160 is charged from a charging station. The power system 170 may include or interface with battery sensors for determining a current charge level of the battery 160 and a discharging rate. The power system 170 may include an onboard charger that converts alternating current (AC) to direct current (DC). The onboard charger is used when the AEV 110 is charged by a charging station that delivers AC; if the charging station delivers DC, the onboard charger is bypassed. The power system 170 is described further in relation to FIG. 5.

The fleet management system 120 manages the fleet of AEVs 110. The fleet management system 120 may manage one or more services that provide or use the AEVs 110, including a service for providing AEVs as on-demand power supplies. The fleet management system 120 may further provide a service for providing rides to users with the fleet of AEVs 110, a service that delivers items using the AEVs 110 (e.g., prepared foods, groceries, packages, etc.), or other services that use the fleet of AEVs 110. A single AEV 110 may be able to perform multiple services, e.g., at certain times, AEV 110a provides rides to users, and at other times, the AEV 110a is used to supply power. The fleet management system 120 may assign an AEV 110 to a particular task depending on demand for the various services and AEV availability. For example, the fleet management system 120 may assign an AEV 110 to any task on a first-come first-served basis, or the AEV 110 may adjust the availability of the AEVs for different types of services based on changing demand for different services and margins on the various services. In some embodiments, the fleet management system 120 dynamically adjusts availability and cost for services based on real-time demand and other factors. For example, the fleet management system 120 may make more AEVs 110 available to provide backup power during a wide-spread power outage.

After selecting an AEV from the fleet of AEVs 110 to perform a particular service or other task, the fleet management system 120 instructs the selected AEV (e.g., AEV 110a) to autonomously drive to a particular location (e.g., a home 180 affected by a power outage). The fleet management system 120 also manages fleet maintenance tasks, such as charging and servicing of the AEVs 110. As shown in FIG. 1, each of the AEVs 110 communicates with the fleet management system 120. The AEVs 110 and fleet management system 120 may connect over a public network, such as the Internet. The fleet management system 120 is described further in relation to FIG. 6.

The fleet management system 120 may operate a network of charging stations. The network of charging stations may include a single type of charging station (e.g., DC fast-charging stations), or a mix of charging stations (e.g., some AC level 2 charging stations, and some DC fast-charging stations). Charging stations in the network may be distributed across one or more geographic regions in which the fleet of AEVs 110 provides service. Charging stations may be included in AEV facilities operated by the fleet management system 120, e.g., facilities for storing, charging, and/or maintaining AEVs. In some embodiments, the AEVs 110 may use charging stations outside of the network operated by the fleet management system 120, e.g., charging stations available to the public, charging stations in private homes, charging stations on corporate campuses, etc. The fleet management system 120 maintains status information of charging stations, including which charging stations are operational. In the case of a power outage, certain charging stations connected to the electricity grid may be affected and unable to charge AEVs until power is restored.

The fleet management system 120 receives service requests for the AEVs 110 from user devices 130. For example, a user makes a request for backup power on the user device 130, which transmits the request to the fleet management system 120. The user provides a location at which the power supply is requested, e.g., the address of the user's home 180. In some embodiments, the home 180 may include equipment for alerting the fleet management system 120 when backup power is requested. For example, the home 180 may have a power monitoring system that automatically detects when power supply to the home 180 has been interrupted, and automatically transmits an alert to the fleet management system 120. If the user has requested that the fleet management system 120 provide backup power to the home 180 when the power supply is interrupted, the fleet management system 120 may select an AEV 110 to drive to the home 180 in response to the alert from the power monitoring system. While an example of a home 180 is described herein, in other examples, other types of buildings may be powered by an AEV 110 or set of AEVs 110, including multi-unit residential buildings, stores, restaurants, office buildings, other commercial buildings, etc.

In some embodiments, the fleet management system 120 also receives data from a utility company 190 that supplies power to customers. The utility company 190 may provide information describing planned and/or unplanned power outages to the fleet management system 120, or the fleet management system 120 may obtain publicly available data provided by the utility company 190 describing such outages. The fleet management system 120 may use the utility data to identify locations for providing power supplies and identify times or predicted times during which power is to be supplied. In some embodiments, the utility company 190, rather than a utility customer, may submit a request for power to the fleet management system 120. For example, the utility company 190 may request that the fleet management system 120 send one or more AEVs 110 to one or more customers' homes, or the utility company 190 may request that the fleet management system 120 send one or more AEVs 110 to a specific location to plug into the power grid.

Example AEV Fleet Response to Power Supply Request

Figure 2:
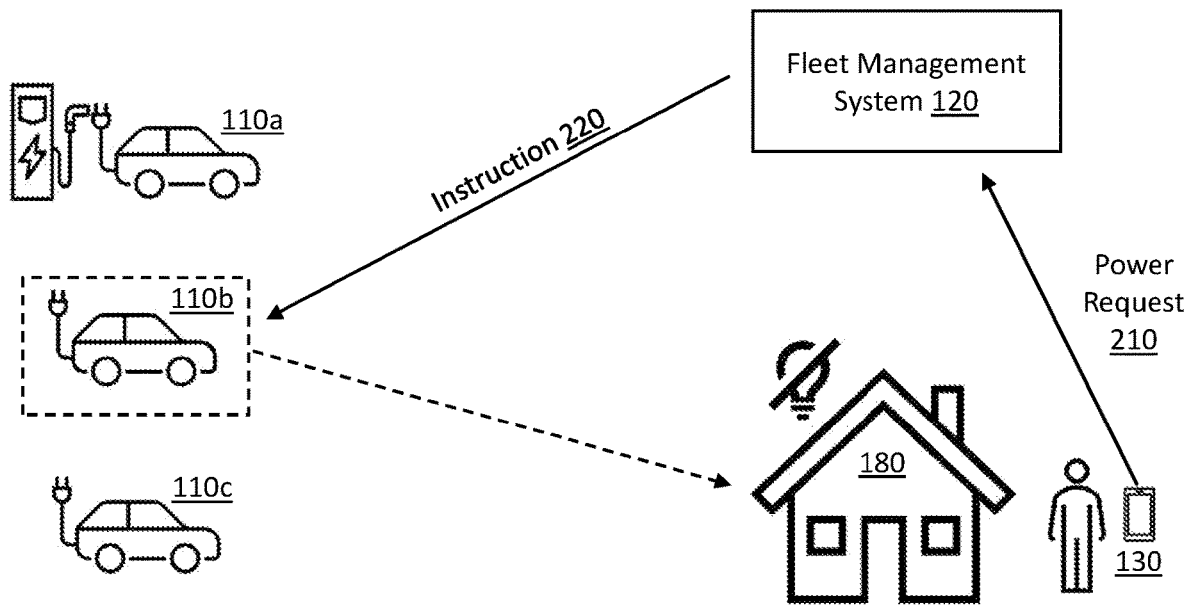
FIG. 2 illustrates an example fleet management system dispatching a selected AEV to provide power to a user, according to some embodiments of the present disclosure.

FIG. 2 illustrates an example fleet management system dispatching a selected AEV to provide power to a user, according to some embodiments of the present disclosure. The fleet management system 120 manages a fleet of AEVs 110, as described above. In this example, the fleet includes a first AEV 110*a*, a second AEV 110*b*, and a third AEV 110*c*. The first AEV 110*a* is plugged into a charging station and is being charged. The second and third AEVs 110*b* and 110*c* are available to be dispatched.

The fleet management system 120 receives a power request 210 from a user via the user device 130. The user may input parameters of the power request 210 into the user device 130 via a user interface provided by the fleet management system 120. For example, the user may indicate a start time of the power request (e.g., as soon as possible because power is currently out, or at an expected start time of the power outage). The user may further indicate an end time for the power request if an estimated end time of the power outage is known to the user, or if the user is requesting power for a fixed duration of time. The user also provides information describing the amount of power needed. For example, the user inputs on the user device 130 information about device(s) or building(s) to be powered, e.g., that the user wants to power the home 180, which has three bedrooms and is running central air conditioning. As another example, the user inputs on the user device 130 a requested power rate (e.g., 2 kW) or a requested amount of power (e.g., 30 kWh). The user further provides the location of the request, e.g., the address of the home 180. In some embodiments, some or all of the parameters are stored in a user profile associated with the user, and the fleet management system 120 retrieves the parameters in response to the power request 210 from the user.

The fleet management system 120 selects an AEV of the fleet, in this case the second AEV 110*b*, to service the power request 210. The fleet management system 120 transmits an instruction 220 to the second AEV 110*b* to autonomously drive to the home 180. The fleet management system 120 selects the second AEV 110*b* from the fleet of AEVs 110 based on the parameters of the power request 210 and data describing the AV fleet 110. For example, the fleet management system 120 selects the second AEV 110*b* because it is located near to the home 180 and has sufficient charge to drive to the home 180, provide the requested amount of power, and drive to a charging station. The fleet management system 120 may balance various requests for power and other services (e.g., rides or delivery services) in assigning AEVs to various tasks. For example, the third AEV 110*c* may have a higher charge level than the second AEV 110*b*, and the fleet management system 120 assigns the third AEV 110*c* to a second power request for a higher amount of power than the power request 210.

Figure 3:
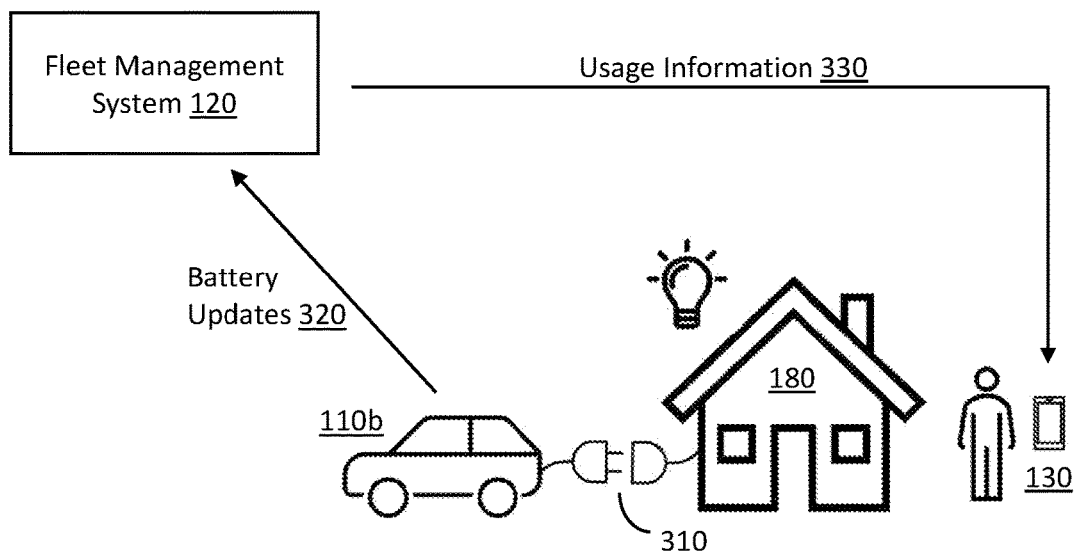
FIG. 3 illustrates the selected AEV providing power as requested and updating the fleet management system, according to some embodiments of the present disclosure.

FIG. 3 illustrates the selected AEV 110*b* providing power as requested and updating the fleet management system 120, according to some embodiments of the present disclosure. The second AEV 110*b* forms a connection 310 to the home 180 to deliver power from the battery of the AEV 110*b* to the home 180. For example, an outlet connected to the AEV 110*b* connects to a plug on the home 180. The connection may be a two-way plug, i.e., the electrical system of the home 180 can either provide charge to the battery of the AEV 110*b* via the connection (while the home 180 has another source of electricity and can charge the AEV 110*b*) or receive charge from the battery of the AEV 110*b* via the connection (while the AEV 110*b* is acting as a power supply). Other electrical connections may be used. In some embodiments, the user plugs the second AEV 110*b* into the home 180 to form the connection 310. In other embodiments, the second AEV 110*b* automatically forms the connection 310, e.g., using a robotic arm mounted on the AEV 110*b* or the home 180. This can allow the AEV 110*b* to provide power even when no one is in the home 180.

While the second AEV 110*b* is powering the home 180, the second AEV 110*b* transmits battery updates 320 to the fleet management system 120. The battery updates 320 include a current charge level of the battery. The second AEV 110*b* may transmit the battery updates 320 at periodic intervals, e.g., an update with the current charge level every minute or every five minutes. The battery updates 320 may include additional information, such as a current discharge rate, i.e., the current power draw of the home 180.

The fleet management system 120 may report usage information 330 to the user device 130. The usage information 330 may include, for example, a total amount of energy consumed by the home 180, a current energy consumption rate of the home 180, data showing the energy consumption rate over time, an amount of available charge remaining in the second AEV 110*b*, and/or an estimated amount of time that the second AEV 110*b* will be able to continue charging the home 180. The user may adjust energy consumption based on the usage information 330. For example, if the usage information 330 indicates a higher than expected energy consumption rate, the user may turn down an air conditioner, turn off lights, unplug devices, or take other actions to reduce consumption.

Figure 4:
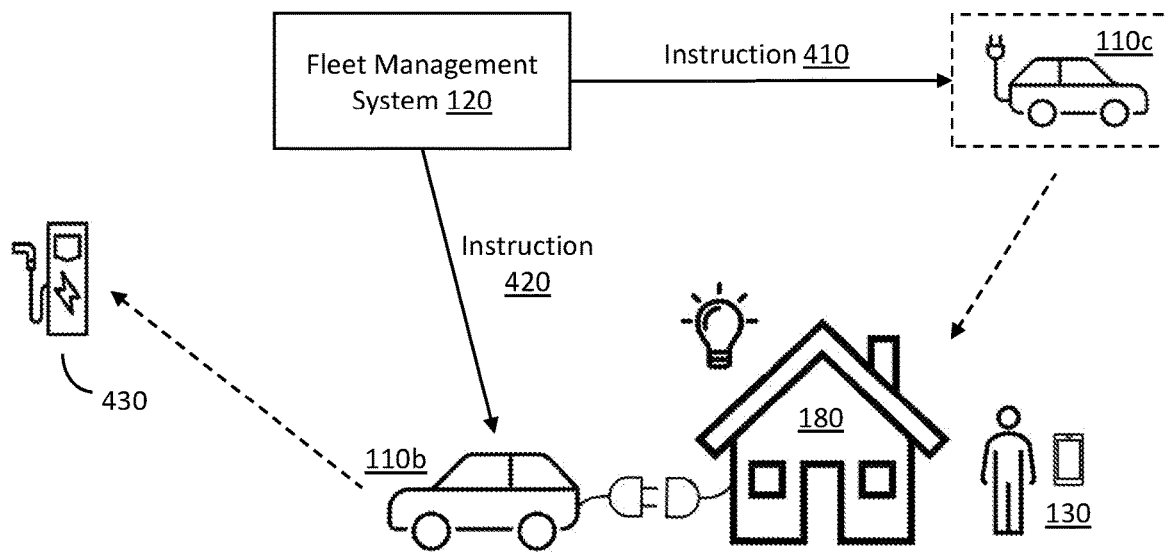
FIG. 4 illustrates the fleet management system instructing the selected AEV to return for charging and instructing a different AEV to provide power to the user, according to some embodiments of the present disclosure.

FIG. 4 illustrates the fleet management system 120 instructing the selected AEV 110*b* to return for charging and instructing a different AEV 110*c* to provide power to the user, according to some embodiments of the present disclosure. In some cases, the power needed to service a power request exceeds the amount of power that can be provided by a single AEV. For example, if a power outage at the home 180 extends over many hours or multiple days, the battery capacity of the second AEV 110*b* may be insufficient to power the home 180 for the full duration of the power outage. As shown in FIG. 3, the fleet management system 120 continually monitors the battery level of the second AEV 110*b*. When the battery level of the second AEV 110*b* becomes low, the fleet management system 120 swaps the second AEV 110*b* out for another AEV in the fleet 110.

The fleet management system 120 transmits an instruction 410 to another AEV in the fleet, here, the third AEV 110*c* from FIG. 2, to drive to the home 180. The fleet management system 120 factors in the parameters of the request and parameters of the available AEVs in the fleet to select the third AEV 110*c*, as described in relation to FIG. 2. The fleet management system 120 also transmits an instruction 420 to the second AEV 110*b* to drive to a charging station 430 to recharge its battery. The fleet management system 120 may transmit the instruction 410 to the third AEV 110*c* such that the third AEV 110*c* arrives at the home 180 before the second AEV 110*b* is instructed to leave the home 180 and drive to the charging station 430. This way, the home 180 has a minimal interruption of power, e.g., the time to unplug the second AEV 110*b* and plug the third AEV 110*c* into the home 180. In addition, the fleet management system 120 arranges for the third AEV 110*c* to arrive at the home 180 while the second AEV 110*b* has sufficient charge to drive to the charging station 430.

Example AEV Power System

Figure 5:
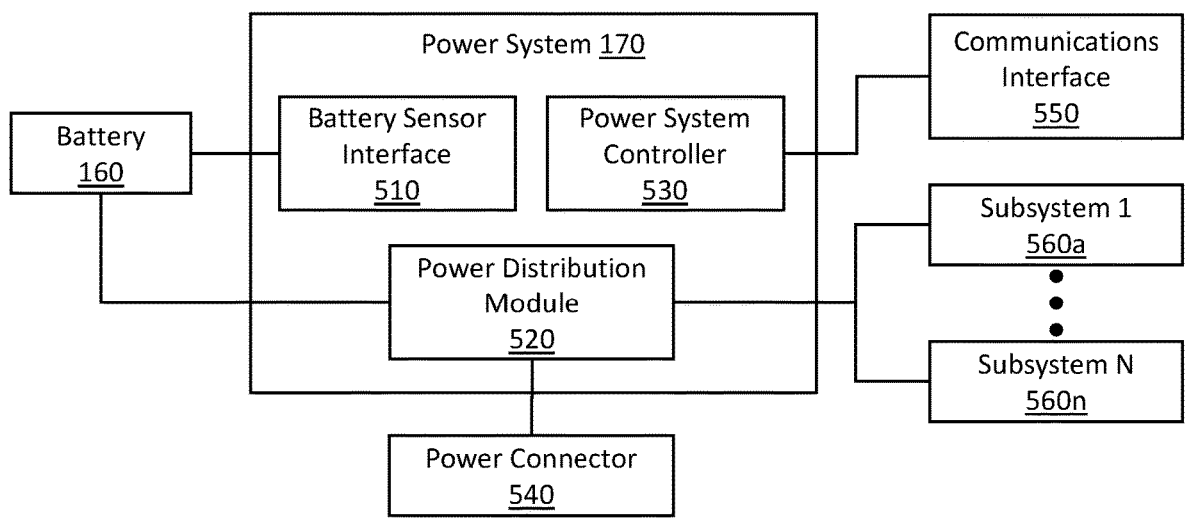
FIG. 5 is a block diagram of a power system and several connected AEV components according to some embodiments of the present disclosure.

FIG. 5 is a block diagram of a power system and several connected AEV components according to some embodiments of the present disclosure. The power system 170 includes a battery sensor interface 510, a power distribution module 520, and a power system controller 530. The block diagram also includes the battery 160, a power connector 540, a communications interface 550, and various AEV subsystems 530*a* through 530N. In alternative configurations, different and/or additional components may be included in the power system 170. Further, functionality attributed to one component of the power system 170 may be accomplished by a different component included in the power system 170 or a different system than those illustrated.

The battery sensor interface 510 interfaces with one or more battery sensors integrated into the battery 160. The battery sensor senses a current charge level of the battery 160, and the battery sensor interface 510 receives the charge level from the battery sensor. In some embodiments, a battery sensor senses power drawn from the battery 160, e.g., the wattage or current being drawn from the battery 160, and provides this information to the battery sensor interface 510.

The power distribution module 520 receives and distributes power to various systems on and of the AEV 110. During a driving mode, the power distribution module 520 draws energy from the battery 160 and distributes the energy to the AEV subsystems 560*a*-560N. During a power source mode, the power distribution module 520 draws energy from the battery 160 and distributes the energy to an external system via the power connector 540. During a charging mode, the power distribution module 520 receives energy from a charging station via the power connector 540 and directs the energy to the battery 160 to charge the battery 160. In some embodiments, the AEV 110 includes multiple power connectors, e.g., one or more power inlets for receiving power from a charging station, and one or more power outlets for supplying power to one or more external devices. In some embodiments, the AEV 110 includes a power strip that a user can plug one or more devices (e.g., a computer, speakers, device chargers, medical equipment, etc.) into directly.

The subsystems 560*a*-560N represent various subsystems of the AEV 110 that are powered by the battery 160 (or, in some embodiments, by the power connector 540 during a charging mode). A single EV subsystem is referred to herein as subsystem 560, and the collection of subsystems are referred to collectively as subsystems 560. For example, subsystem 1 560*a* is a vehicle propulsion system that draws power during the driving mode to move the AEV 110 on a roadway. Other subsystems 560 include steering, braking, AV systems (such as the sensor suite 140 and signal processing systems), lighting, user interfaces, and HVAC. Some subsystems 560, such as the AV systems, may draw power in the driving mode and other modes, including the charging mode, power source mode, an idle mode, etc. The communications interface 550 is another subsystem that draws power in the driving mode, charging mode, and power source mode.

The power system controller 530 communicates with the other components of the power system 170, including the battery sensor interface 510 and power distribution module 520, and controls the power distribution module 520. The power system controller 530 connects to the battery sensor interface 510 to obtain a current charge level of the battery 160 and any other battery sensor data. The power system controller 530 monitors a level of charge of the battery 160. The power system controller 530 may compare the level of charge to a threshold level, e.g., an amount of charge for the AEV 110 to return to a charging station, plus a buffer to ensure that the AEV 110 does not run out of battery while driving to the charging station. In response to the charge level of the battery 160 reaching the threshold level, the power system controller 530 switches the power distribution module 520 from the power source mode to the driving mode. In particular, the power system controller 530 instructs the power distribution module 520 to discontinue distributing power to an external system (e.g., the home 180) and to instead direct power to AV and movement-related subsystems so that the AEV 110 can drive to a charging station. In the power source mode, the power system controller 530 may also monitor a rate of energy distribution from the battery 160, either by receiving data describing the rate of energy distribution from the battery sensor interface 510, or by deriving the rate of energy distribution from a series of measurements of the charge level of the battery 160 taken over a period of time.

The power system controller 530 communicates with the fleet management system 120 via the communications interface 550. The communications interface 550 is a wireless network connection for connecting to the fleet management system 120 via a network. For example, the communications interface 550 connects to a cellular data network or a Wi-Fi network. During the power source mode, the power system controller 530 transmits data describing the level of charge in the battery 160 and the rate of energy distribution from the battery 160 to the fleet management system 120 via the communications interface 550. Based on the battery information, the fleet management system 120 may determine that the AEV 110 should discontinue powering the external system and return to a charging station (e.g., based on the battery charge level reaching a threshold level), and the power system controller 530 receives an instruction from the fleet management system 120 to discontinue distributing power to the external system via the communications interface 550. In another embodiment, the fleet management system 120 determines the threshold level for the AEV 110 to switch to the driving mode and return to the power station (e.g., based on current traffic conditions and the location of the nearest charging station), and the power system controller 530 receives the threshold level at which it should switch into driving mode from the fleet management system 120 via the communications interface 550. The communications interface 550 may also receive an instruction from the fleet management system 120 to return to the charging station, and the onboard computer 150 navigates to the charging station in response to the instruction.

In an embodiment, the power system controller 530 is configured to throttle the energy distribution to the external system. For example, the power system controller 530 receives an instruction from the fleet management system 120 to provide no more than threshold rate of power. This instruction be based on a user specification; for example, the user requested 2 kW of power, or the user requested to have power for 3 hours, which necessitates a certain average power distribution rate. If the external system (e.g., the home 180) demands power at a higher rate, the power system controller 530 instructs the power distribution module 240 to throttle the rate of energy distribution to the threshold rate. In some embodiments, the power system controller 530 allows power distribution spikes, but if the demand exceeds the threshold for more than a certain period of time (e.g., five minutes), the power system controller 530 throttles the power to not empty the battery 160 too quickly.

Example Fleet Management System

Figure 6:
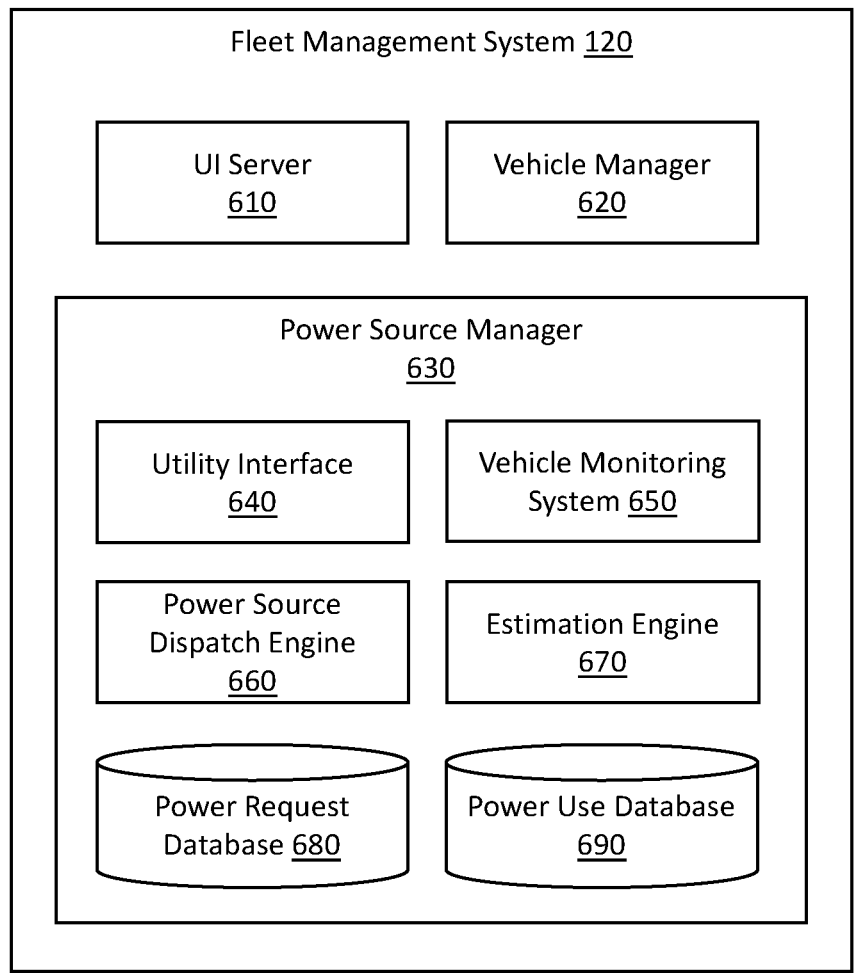
FIG. 6 is a block diagram of the fleet management system according to some embodiments of the present disclosure.

FIG. 6 is a block diagram of the fleet management system 120 according to some embodiments of the present disclosure. The fleet management system 120 includes a UI (user interface) server 610, a vehicle manager 620, and a power source manager 630. The power source manager 630 includes a utility interface 640, a vehicle monitoring system 650, a power source dispatch engine 660, an estimation engine 670, a power request database 680, and a power use database 690. In alternative configurations, different and/or additional components may be included in the fleet management system 120. Further, functionality attributed to one component of the fleet management system 120 may be accomplished by a different component included in the fleet management system 120 or a different system than those illustrated.

The UI server 610 is configured to communicate with client devices, such as the user device 130, that provide a user interface to users. For example, the UI server 610 may be a web server that provides a browser-based application to client devices, or the UI server 610 may be a mobile app server that interfaces with a mobile app installed on client devices. The user interface enables the user to access a service of the fleet management system 120, e.g., a mobile power source service. The user interface, or another user interface provided by the fleet management system 120, may enable users to access additional services of the fleet management system 120, e.g., to request a ride from an AEV 110, to request a delivery from an AEV 110.

In some embodiments, the UI server 610 receives a request a from a user device 130 for power at a given location, e.g., the user's home, business, a park, or another location. The UI server 610 may receive a request to be fulfilled immediately or at a particular time in the future, e.g., a request submitted by a user in response to an unexpected outage at their home, or a request submitted by a user to obtain power at an off-grid location, such as a park, a campsite, or a home not connected to a power grid (e.g., an off-grid solar-powered home with an empty or malfunctioning battery backup system). The user may supply the service location, an expected duration to receive power, and information describing expected energy usage, e.g., a number of devices to be charged, the size of a home to be powered, the number of households to be powered, etc., in the user interface, and these parameters are received at the UI server 610.

In other embodiments, the UI server 610 receives a request to receive power in the event of a future power outage. A user can sign up for a service (e.g., a subscription service or standby service) in which the fleet management system 120 automatically instructs an AEV 110 to drive to a location and serve as a backup power supply when the location experiences a power outage, for the duration of the power outage. In the event of a detected power outage (e.g., detected by the utility company 190, or detected by a monitoring device at the location), the UI server 610 may transmit a message to the user device 130 requesting confirmation that the location is experiencing a power outage and that the user wants a backup power supply. If the AEV 110 is manually connected to the home, the UI server 610 may transmit a message requesting confirmation that a person will be available to plug the AEV 110 in at the location. The UI server 610 receives and stores the service location, information describing expected energy usage, and any other relevant information (e.g., information about an on-premise monitoring system that alerts the fleet management system 120 if it detects a power outage) in the power request database 680.

In other embodiments, the UI server 610 receives a request from the utility company 190 to provide power to one or more customers or to add supplemental power to the power grid. For example, if the utility company 190 determines that it cannot meet demand to at least one customer location (e.g., due to high temperatures creating unusually high demand, or due to outages at one or more generation facilities), the utility company 190 can request one or more AEVs 110 distribute power in a particular area. As another example, if the utility company 190 is performing upgrades or other work in a certain area that involves disconnecting one or more customers from the grid, the utility company 190 can request that the fleet management system 120 provide backup power AEVs 110 to the affected customers.

The UI server 610 can receive other types of requests for power, and the fleet of AEVs 110 can service other types of requests. For example, a mobile medical facility requests one or more AEVs 110 to provide power at a mobile or temporary hospital set up in a field, park, or other area that is not serviced or sufficiently serviced by the grid. As another example, a construction company requests one or more AEVs 110 to provide power at a construction site, rather than relying on generator power. As still another example, a user may request one or more AEVs 110 to provide power to a home or other building even when grid power is available. More particularly, the user may request one or more AEVs 110 to provide power when the cost of receiving power from AEVs 110 is less than the cost of receiving power from a utility company.

The UI server 610 may provide updates to users while a power request is being serviced by an AEV 110. As one example, when the UI server 610 receives a request for power from a user, the UI server 610 provides one or more estimates to the user device 130 from the estimation engine 670, e.g., an estimated energy consumption rate, an estimated cost based on the estimated energy consumption rate, and/or an estimated amount of time for which the AEV 110 can provide power. The UI server 610 receives an alert from the power source manager 630 (e.g., the vehicle monitoring system 650) that an energy distribution rate from the battery 160, i.e., an energy consumption rate at the location, is higher than an estimated energy consumption rate for the location (e.g., higher than the estimation from the estimation engine 670). In response, the UI server 610 transmits a device to the user device 130 alerting the user that the AEV 110 may run out of power sooner than anticipated, or that the cost to the user may be higher than the estimate provided. The UI server 610 may provide recommendations for reducing energy consumption and/or offer to provide one or more additional AEVs 110 to better match the actual energy consumption at the location.

The vehicle manager 620 manages and communicates with a fleet of AEVs, including AEVs 110a through 110N. The vehicle manager 620 directs the movements of the AEVs 110 in the fleet. For example, the vehicle manager 620 instructs an AEV 110 to drive to a particular location and perform a service requested by a user through the UI server 610, such as providing a ride to a user, providing a delivery service, or providing a power supply at a given location. The vehicle manager 620 may instruct AEVs 110 to drive to other locations while not servicing a user, e.g., to improve geographic distribution of the fleet, to anticipate demand at particular locations, to drive to a charging station for charging, etc. The vehicle manager 620 also instructs AEVs 110 to return to EV facilities for maintenance or storage.

The power source manager 630 manages the power supply service provided by the AEV fleet 110. The power source manager 630 receives the power request information submitted by users from the UI server 610. The power source manager 630 determines an estimated amount of energy for servicing the request based on the information received, e.g., based on a duration of the request and data describing energy usage at the location. The power source manager 630 selects an AEV 110 of the fleet to fulfill the request based on various factors, such as the current location of the AEV 110, the location of the request, a battery level of a battery of the AEV 110, and the estimated amount of energy for servicing the request. The power source manager 630 indicates the selected AEV 110 to the vehicle manager 620, and the vehicle manager 620 instructs the selected AEV 110 to drive to the location of the request.

In the example shown in FIG. 6, the power source manager 630 includes a utility interface 640, a vehicle monitoring system 650, a power source dispatch engine 660, an estimation engine 670, a power request database 680, and a power use database 690. The utility interface 640 receives information from the utility company 190 describing power outages. The utility interface 640 may obtain power outage data from a private data feed provided by the utility company 190, a public data feed published online or otherwise provided by the utility company 190, or from a third party data source. The power outage information includes data describing areas affected (e.g., a set of locations, or geographic boundaries of an outage), a start time of the power outage, and an expected time that the utility company 190 will restore power. The power outage information may include information describing both planned and unplanned outages. In some embodiments, the utility interface 640, rather than the UI server 610, receives requests from the utility company 190 to provide power to customers or to the grid during a power outage, as described above.

The vehicle monitoring system 650 receives data from the fleet of AEVs 110 before, during, and after power supply tasks. The vehicle monitoring system 650 maintains data describing current battery levels, including battery levels of AEVs 110 available to be assigned to power requests, and battery levels of AEVs 110 during power source mode. The vehicle monitoring system 650 also monitors the rate of energy distribution during power source mode. The vehicle monitoring system 650 may receive the rate of energy distribution from the AEV 110, or calculate the rate of energy distribution based a set of previous battery levels. The vehicle monitoring system 650 or AEV 110 (e.g., the power system controller 530) may calculate an average distribution rate over a given time interval or perform data smoothing on the energy distribution data to smooth short-term peaks and drops in consumption. The vehicle monitoring system 650 may also receive and maintain the current locations of AEVs 110, or the vehicle manager 620 may track the AEV locations.

The power source dispatch engine 660 selects and dispatches AEVs 110 for servicing power requests. For requests for power at a given time and location, the power source dispatch engine 660 selects an AEV 110 based on the parameters of the power request (e.g., location, duration, estimated power consumption rate) and based on data describing the available AEVs 110 (e.g., location, charge levels). If the utility interface 640 or an interface to an on-location monitoring system detects a power outage, the power source dispatch engine 660 compares the outage information to the power request database 680, which stores requests to be fulfilled in the event of future power outages. If the power source dispatch engine 660 identifies a location to service in the power request database 680, the power source dispatch engine 660 retrieves certain parameters stored in the database, e.g., the location and estimated power consumption rate, used to select an AEV. The power source dispatch engine 660 may determine additional parameters, such as a total power requirement based on the estimated power consumption rate and an estimated duration of the power outage (e.g., received via the utility interface 640). The power source dispatch engine 660 associates the estimated duration and total power requirement with the request and selects an AEV 110 for the detected power outage based on the request parameters. In some embodiments, the power source dispatch engine 660 selects and dispatches multiple AEVs 110, e.g., if the utility company 190 requests AEVs 110 to plug directly into the grid and provide supplemental power, or for a commercial or multi-unit building.

As noted above, while the AEV 110 is providing power in the power source mode, the AEV 110 transmits data to the vehicle monitoring system 650 with an updated battery level, and the vehicle monitoring system 650 determines the energy distribution rate from the battery, e.g., an average or moving average of the energy distribution rate. The power source dispatch engine 660 calculates an estimated duration for which the AEV 110 can continue to service the power request based on the updated battery level and the energy distribution rate. The power source dispatch engine 660 also factors in the amount of energy for the AEV 110 to return to the charging station in determining the estimated duration, such that the AEV 110 switches from the power source mode to driving mode with enough energy in the battery 160 to drive to the charging station. The power source dispatch engine 660 compares the estimated duration that the AEV 110 can continue servicing the request to an estimated time for servicing the request, e.g., a time at which the utility company 190 expects to restore power. If the estimated time that the AEV 110 can service the power request is less than the estimated time for servicing the request, the power source dispatch engine 660 selects a second AEV from the fleet 110 to continue fulfilling the request, as shown in the example of FIG. 4. The power source dispatch engine 660 determines a cutoff time until which the AEV 110 cam service the power request, and dispatches the second AEV to the location of the request such that the second AEV reaches the location before the cutoff time.

The estimation engine 670 estimates an energy consumption rate for a power request based on data provided by the user, historical power use data stored in the power use database 690, current weather information, and/or other factors. In one embodiment, the estimation engine 670 receives parameters from the UI server 610 that were input by a user and describe the location and/or power use at the location. For example, for a house, the user provides any or all of the size of the house (e.g., square footage, number of bedrooms), number of people in the house, appliances running in the house, air conditioning types and settings, electric heaters, home office information, etc. The estimation engine 670 estimates the energy consumption rate for the location based on the data provided by the user. The estimation engine 670 may adjust the estimate based on external factors, such as time of day and current weather conditions.

In another embodiment, the estimation engine 670 uses data in the power use database 690 to estimate the energy consumption. If the power use database 690 includes data describing previous power use at the location (e.g., power use during a prior power outage, or power use provided by a utility company 190), the estimation engine 670 can retrieve the prior power use and optionally make one or more adjustments to the prior power use data based on the weather and/or time of day if the previous power use data was collected under different conditions. In some embodiments, even if the power use database 690 does not include prior power use for a requested location, the estimation engine 670 may use data in the power use database 690 to generate an accurate estimate of energy consumption based on recorded energy consumption at other locations described by similar parameters.

Having estimated the power distribution rate, the estimation engine 670 can calculate an estimated amount of energy for servicing the request by multiplying the energy consumption rate by a duration for the request, e.g., a duration provided by the user, or an estimated duration of the power outage provided by the utility company 190.

Example Processes for Dispatching a Power Source

Figure 7:
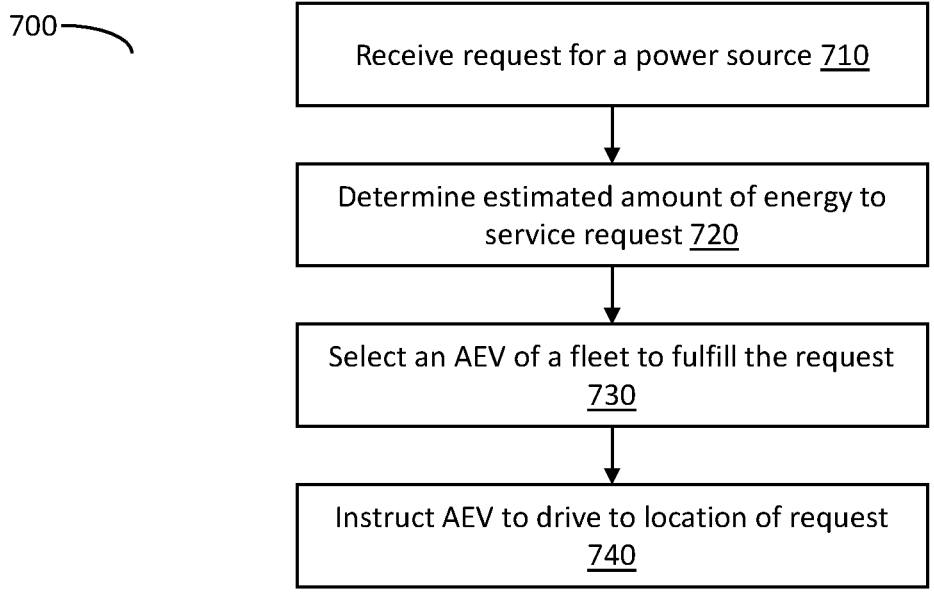
FIG. 7 is a flowchart showing a process for dispatching a power source according to some embodiments of the present disclosure.

FIG. 7 is a flowchart showing a process 700 for dispatching a power source according to some embodiments of the present disclosure. A fleet management system 120 (e.g., the UI server 610) receives 710 a request for a power source. The request includes a location to deliver power and timing information, e.g., a time to start providing power, and a duration or estimated duration to provide power.

The fleet management system 120 determines 720 an estimated amount of energy for servicing the request. The fleet management system 120 (e.g., the estimation engine 670) determines the estimated amount of energy based on the timing information and data describing energy usage at the location.

The fleet management system 120 selects 730 an AEV from a fleet of AEVs to fulfill the request. For example, the power source dispatch engine 660 selects an AEV based on the current location of the selected AEV, the requested location, a battery level of the selected AEV, and the estimated amount of energy for servicing the request.

The fleet management system 120 instructs 740 the AEV to drive to the location of the power request. The AEV distributes electric power from its battery upon reaching the location.

SELECT EXAMPLES

Example 1 provides a method for dispatching a power source including receiving a request for a power source, the request comprising a location and timing data; determining an estimated amount of energy for servicing the request based at least in part on the timing data and data describing energy usage at the location; selecting an AEV from a fleet of AEVs to fulfill the request, the AEV selected based on a current location of the AEV, the location, a battery level of a battery of the AEV, and the estimated amount of energy for servicing the request; and instructing the AEV to drive to the location, wherein the AEV is configured to distribute electric power from the battery upon reaching the location.

Example 2 provides the method according to example 1, where the method further includes receiving, from the AEV, an updated battery level of the battery, and calculating an estimated duration for which the AEV can service the request, the estimated duration calculated based on the updated battery level, a distribution rate of the battery, and an estimated amount of energy for the AEV to return to a charging station.

Example 3 provides the method according to example 2, where the method further includes determining that an estimated time for servicing the request exceeds the estimated duration for which the AEV can service the request, selecting a second AEV from the fleet of AEVs to fulfill the request, determining a cutoff time until which the AEV can distribute electric power in service of the request based on the estimated duration, and instructing the second AEV to drive to the location such that the second AEV reaches the location before the cutoff time.

Example 4 provides the method according to any of the preceding examples, where determining the estimated amount of energy for servicing the request includes determining an estimated energy consumption rate for the request, the estimated energy consumption rate based on at least one of usage data received from a user and historical energy consumption data from a prior request; determining, based on the timing data, an estimated duration for the request, the timing data received from at least one of a user and a utility company; and calculating the estimated amount of energy based on the estimated energy consumption rate and the estimated duration.

Example 5 provides the method according to example 4, where the method further includes determining an actual energy consumption rate for the request based a rate at which the AEV distributes electric power from the battery at the location, comparing the actual energy consumption rate to the estimated energy consumption rate, and, in response to determining that the actual consumption rate is higher than the estimated energy consumption rate, transmitting an alert to a user device.

Example 6 provides the method according to any of the preceding examples, where the request for a power source is submitted by a user, and the location, timing data, and data describing energy usage at the location are input by the user through a user interface of a user device and transmitted from the user device to a fleet management system.

Example 7 provides the method according to any of examples 1 through 5, where the request for a power source is a request submitted by a user to receive backup power during a power outage, and the method further includes receiving, from at least one of a utility company and a monitoring device at the location, an alert that the location has a power outage; receiving, from the utility company, an estimated duration of the power outage; and determining the estimated amount of energy for servicing the request further based on the estimated duration.

Example 8 provides the method according to any of examples 1 through 5, where the request for a power source is received from a utility company in response to the utility company determining that it cannot meet demand from at least one customer location, and the AEV distributes power to the at least one customer location.

Example 9 provides a fleet management system including a UI server configured to receive a request for a power source at a location; a power source manager configured to determine an estimated amount of energy for servicing the request based at least in part on a duration associated with the request and data describing energy usage at the location, and select an AEV from a fleet of AEVs to fulfill the request, the AEV selected based on a current location of the AEV, the location, a battery level of a battery of the AEV, and the estimated amount of energy for servicing the request; and a vehicle manager configured to instruct the AEV to drive to the location, wherein the AEV is configured to distribute electric power from the battery upon reaching the location.

Example 10 provides the system according to example 9, where the power source manager is further configured to receive, from the AEV, an updated battery level of the battery, and calculate an estimated duration for which the AEV can service the request, the estimated duration calculated based on the updated battery level, a distribution rate of the battery, and an estimated amount of energy for the AEV to return to a charging station.

Example 11 provides the method according to example 11, where the power source manager is further configured to determine that an estimated time for servicing the request exceeds the estimated duration for which the AEV can service the request, select a second AEV from the fleet of AEVs to fulfill the request, determine a cutoff time until which the AEV can distribute electric power in service of the request based on the estimated duration, and instruct the second AEV to drive to the location such that the second AEV reaches the location before the cutoff time.

Example 12 provides the method according to any examples 9 through 11, where the power source manager is configured to determine the estimated amount of energy for servicing the request by determining an estimated energy consumption rate for the request, the estimated energy consumption rate based on at least one of usage data received from a user and historical energy consumption data from a prior request, and calculating the estimated amount of energy based on the estimated energy consumption rate and the duration associated with the request, the duration received from at least one of a user and a utility company.

Example 13 provides the method according to example 12, where the power source manager is further configured to determine an actual energy consumption rate for the request based a rate at which the AEV distributes electric power from the battery at the location, compare the actual energy consumption rate to the estimated energy consumption rate, and, in response to a determination that the actual consumption rate is higher than the estimated energy consumption rate, transmit an alert to a user device.

Example 14 provides the method according to any of examples 9 through 13, where the request for a power source is submitted by a user, and the location, duration, and data describing energy usage at the location are input by the user through a user interface of a user device and transmitted from the user device to the fleet management system.

Example 15 provides the method according to any of examples 9 through 13, where the request for a power source is a request submitted by a user to receive backup power during a power outage, and the power source manager is further configured to receive, from at least one of a utility company and a monitoring device at the location, an alert that the location has a power outage; receive, from the utility company, an estimated duration of the power outage; and associate the estimated duration with the request.

Example 16 provides the method according to any of examples 9 through 13, where the request for a power source is received from a utility company in response to the utility company determining that it cannot meet demand from at least one customer location, and the AEV distributes power to the at least one customer location.

Example 17 provides an AEV that includes a battery and a power system, the power system including a power distribution module configured to distribute energy from the battery to a plurality of components of the AEV during a driving mode and distribute energy from the battery to at least one external system during a power source mode, and a power system controller configured to monitor a level of charge in the battery and a rate of energy distribution during the power source mode and, in response to the charge level in the battery reaching a threshold level during the power source mode, discontinue distributing power to the at least one external system and entering the driving mode.

Example 18 provides the AEV according to example 17, where the AEV further includes a communications interface configured to transmit, to a fleet management system, data describing the level of charge in the battery and the rate of energy distribution in response to the power system distributing energy from the battery to at least one external system, and receive, from the fleet management system, an instruction to discontinue distributing power to the at least one external system in response to the charge level in the battery reaching a threshold level.

Example 19 provides the AEV according to example 18, where the communications interface is configured to receive an instruction to return to a charging station, and the AEV returns to the charging station in response to the instruction.

Example 20 provides the AEV according to any of examples 17 through 19, where the power system is further configured to throttle the rate of energy distribution to the threshold rate in response to the external system demanding power at a rate higher than a threshold rate.

OTHER IMPLEMENTATION NOTES, VARIATIONS, AND APPLICATIONS

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the figures may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more components. However, this has been done for purposes of clarity and example only. It should be appreciated that the system can be consolidated in any suitable manner. Along similar design alternatives, any of the illustrated components, modules, and elements of the figures may be combined in various possible configurations, all of which are clearly within the broad scope of this Specification.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the systems and methods described above may also be implemented with respect to the methods or systems described herein and specifics in the examples may be used anywhere in one or more embodiments.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. A method for dispatching a power source comprising:
   receiving a request for a power source, the request comprising a location and timing data;
   determining an estimated amount of energy for servicing the request based at least in part on the timing data and data describing energy usage at the location;
   selecting an autonomous electric vehicle (AEV) from a fleet of AEVs to fulfill the request, the AEV selected based on a current location of the AEV, the location, a battery level of a battery of the AEV, and the estimated amount of energy for servicing the request;
   instructing the AEV to drive to the location, wherein the AEV is configured to distribute electric power from the battery upon reaching the location;
   receiving, from the AEV, an updated battery level of the battery; and
   calculating an estimated duration for which the AEV can service the request, the estimated duration calculated based on the updated battery level, a distribution rate of the battery, and an estimated amount of energy for the AEV to return to a charging station.

2. The method of claim 1, further comprising:
   determining that an estimated time for servicing the request exceeds the estimated duration for which the AEV can service the request;
   selecting a second AEV from the fleet of AEVs to fulfill the request;
   determining, based on the estimated duration, a cutoff time until which the AEV can distribute electric power in service of the request; and
   instructing the second AEV to drive to the location such that the second AEV reaches the location before the cutoff time.

3. The method of claim 1, wherein determining the estimated amount of energy for servicing the request comprises:
   determining an estimated energy consumption rate for the request, the estimated energy consumption rate based on at least one of usage data received from a user and historical energy consumption data from a prior request;
   determining, based on the timing data, an estimated duration for the request, the timing data received from at least one of a user and a utility company; and
   calculating the estimated amount of energy based on the estimated energy consumption rate and the estimated duration.

4. The method of claim 3, further comprising:
determining an actual energy consumption rate for the request based on a rate at which the AEV distributes electric power from the battery at the location;
comparing the actual energy consumption rate to the estimated energy consumption rate; and
in response to determining that the actual energy consumption rate is higher than the estimated energy consumption rate, transmitting an alert to a user device.

5. The method of claim 1, wherein the request for a power source is submitted by a user, and the location, timing data, and data describing energy usage at the location are input by the user through a user interface of a user device and transmitted from the user device to a fleet management system.

6. The method of claim 1, wherein the request for a power source is a request submitted by a user to receive backup power during a power outage, the method further comprising:
receiving, from at least one of a utility company and a monitoring device at the location, an alert that the location has a power outage;
receiving, from the utility company, an estimated duration of the power outage; and
determining the estimated amount of energy for servicing the request further based on the estimated duration.

7. The method of claim 1, wherein the request for a power source is received from a utility company in response to the utility company determining that it cannot meet demand from at least one customer location, and the AEV distributes power to the at least one customer location.

8. A fleet management system comprising:
a user interface (UI) server configured to receive a request for a power source at a location;
a power source manager configured to:
determine an estimated amount of energy for servicing the request based at least in part on a duration associated with the request and data describing energy usage at the location; and
select an autonomous electric vehicle (AEV) from a fleet of AEVs to fulfill the request, the AEV selected based on a current location of the AEV, the location, a battery level of a battery of the AEV, and the estimated amount of energy for servicing the request; and
a vehicle manager configured to instruct the AEV to drive to the location, wherein the AEV is configured to distribute electric power from the battery upon reaching the location;
wherein the power source manager is further configured to:
receive, from the AEV, an updated battery level of the battery after the AEV has begun distributing electric power from the battery; and
calculate an estimated duration for which the AEV can service the request, the estimated duration calculated based on the updated battery level, a distribution rate of the battery, and an estimated amount of energy for the AEV to return to a charging station.

9. The system of claim 8, wherein the power source manager is further configured to:
determine that an estimated time for servicing the request exceeds the estimated duration for which the AEV can service the request;
select a second AEV from the fleet of AEVs to fulfill the request;
determine, based on the estimated duration, a cutoff time until which the AEV can distribute electric power in service of the request; and
instruct the second AEV to drive to the location such that the second AEV reaches the location before the cutoff time.

10. The system of claim 8, wherein the power source manager is configured to determine the estimated amount of energy for servicing the request by:
determining an estimated energy consumption rate for the request, the estimated energy consumption rate based on at least one of usage data received from a user and historical energy consumption data from a prior request; and
calculating the estimated amount of energy based on the estimated energy consumption rate and the duration associated with the request, the duration received from at least one of a user and a utility company.

11. The system of claim 10, wherein the power source manager is further configured to:
determine an actual energy consumption rate for the request based on a rate at which the AEV distributes electric power from the battery at the location;
compare the actual energy consumption rate to the estimated energy consumption rate; and
in response to a determination that the actual energy consumption rate is higher than the estimated energy consumption rate, transmit an alert to a user device.

12. The system of claim 8, wherein the request for a power source is submitted by a user, and the location, duration, and data describing energy usage at the location are input by the user through a user interface of a user device and transmitted from the user device to the fleet management system.

13. The system of claim 8, wherein the request for a power source is a request submitted by a user to receive backup power during a power outage, and the power source manager is further configured to:
receive, from at least one of a utility company and a monitoring device at the location, an alert that the location has a power outage;
receive, from the utility company, an estimated duration of the power outage; and associate the estimated duration with the request.

14. The system of claim 8, wherein the request for a power source is received from a utility company in response to the utility company determining that it cannot meet demand from at least one customer location, and the AEV distributes power to the at least one customer location.

15. A non-transitory computer-readable medium storing instructions for dispatching a power source, the instructions, when executed by a processor, cause the processor to:
receive a request for a power source, the request comprising a location and timing data;
determine an estimated amount of energy for servicing the request based at least in part on the timing data and data describing energy usage at the location;
select an autonomous electric vehicle (AEV) from a fleet of AEVs to fulfill the request, the AEV selected based on a current location of the AEV, the location, a battery level of a battery of the AEV, and the estimated amount of energy for servicing the request;
instruct the AEV to drive to the location, wherein the AEV is configured to distribute electric power from the battery upon reaching the location;
receive, from the AEV, an updated battery level of the battery; and calculate an estimated duration for which the AEV can service the request, the estimated duration calculated based on the updated battery level, a distribution rate of the battery, and an estimated amount of energy for the AEV to return to a charging station.

16. The non-transitory computer-readable medium of claim 15, wherein the instructions further cause the processor to:
   determine that an estimated time for servicing the request exceeds the estimated duration for which the AEV can service the request;
   select a second AEV from the fleet of AEVs to fulfill the request;
   determine, based on the estimated duration, a cutoff time until which the AEV can distribute electric power in service of the request; and
   instruct the second AEV to drive to the location such that the second AEV reaches the location before the cutoff time.

17. The non-transitory computer-readable medium of claim 15, the instructions to determine the estimated amount of energy for servicing the request comprise instructions to:
   determine an estimated energy consumption rate for the request, the estimated energy consumption rate based on at least one of usage data received from a user and historical energy consumption data from a prior request;
   determine, based on the timing data, an estimated duration for the request, the timing data received from at least one of a user and a utility company; and
   calculate the estimated amount of energy based on the estimated energy consumption rate and the estimated duration.

18. The non-transitory computer-readable medium of claim 17, wherein the instructions further cause the processor to:
   determine an actual energy consumption rate for the request based on a rate at which the AEV distributes electric power from the battery at the location;
   compare the actual energy consumption rate to the estimated energy consumption rate; and
   in response to determining that the actual energy consumption rate is higher than the estimated energy consumption rate, transmit an alert to a user device.

19. The non-transitory computer-readable medium of claim 15, wherein the request for a power source is submitted by a user, and the location, timing data, and data describing energy usage at the location are input by the user through a user interface of a user device and transmitted from the user device to a fleet management system.

20. The non-transitory computer-readable medium of claim 15, wherein the request for a power source is a request submitted by a user to receive backup power during a power outage, and the instructions further cause the processor to:
   receive, from at least one of a utility company and a monitoring device at the location, an alert that the location has a power outage;
   receive, from the utility company, an estimated duration of the power outage; and
   determine the estimated amount of energy for servicing the request further based on the estimated duration.

* * * * *